Feb. 11, 1936.  J. A. EDEN  2,030,693
LAMINATED PAPER BARREL
Filed March 23, 1934  2 Sheets-Sheet 2
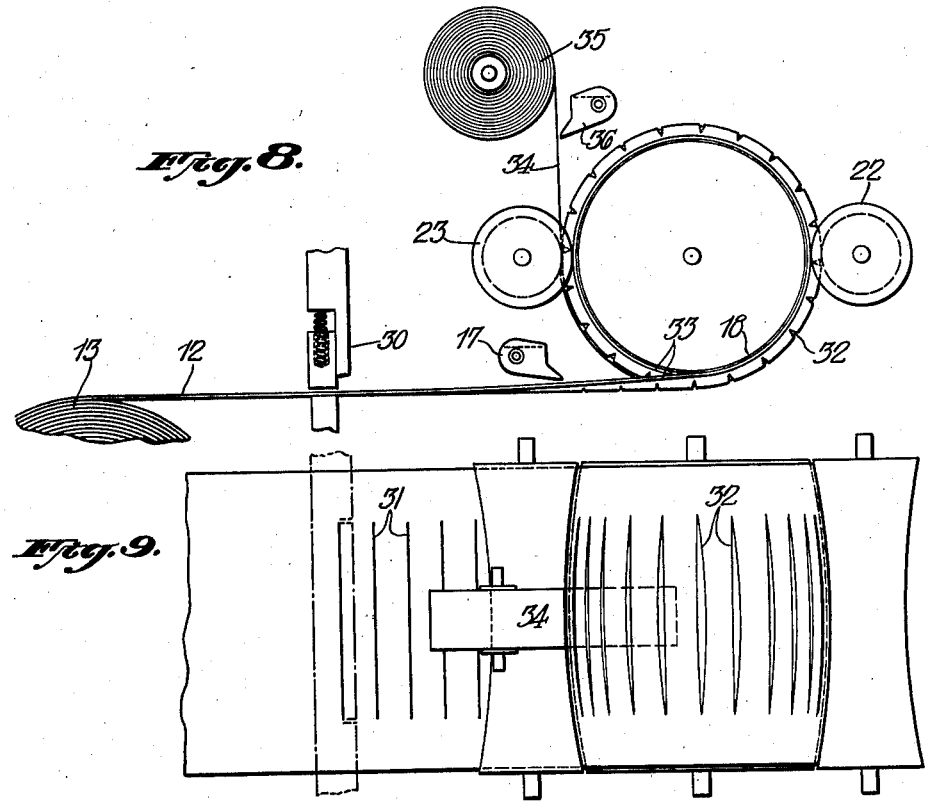
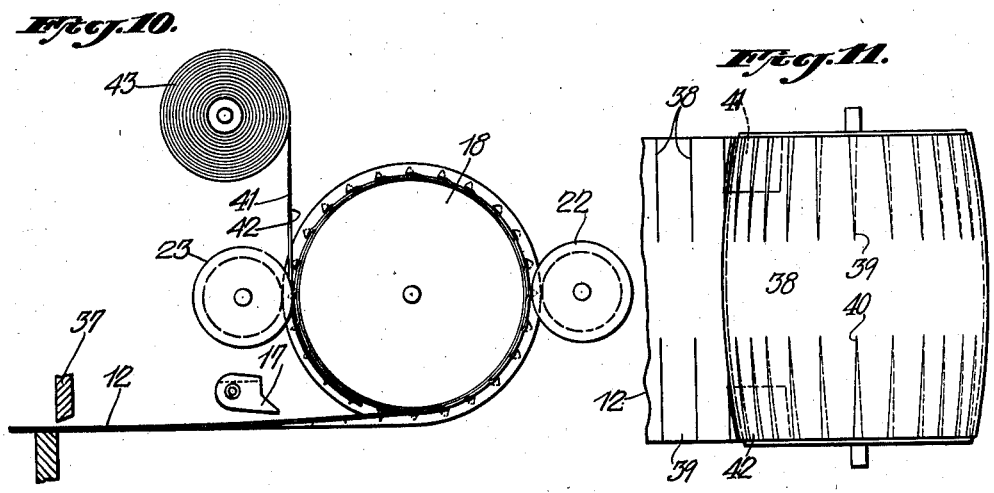
Inventor
JAMES A. EDEN.
By  Usina & Rauber
Attorneys Patented Feb. 11, 1936

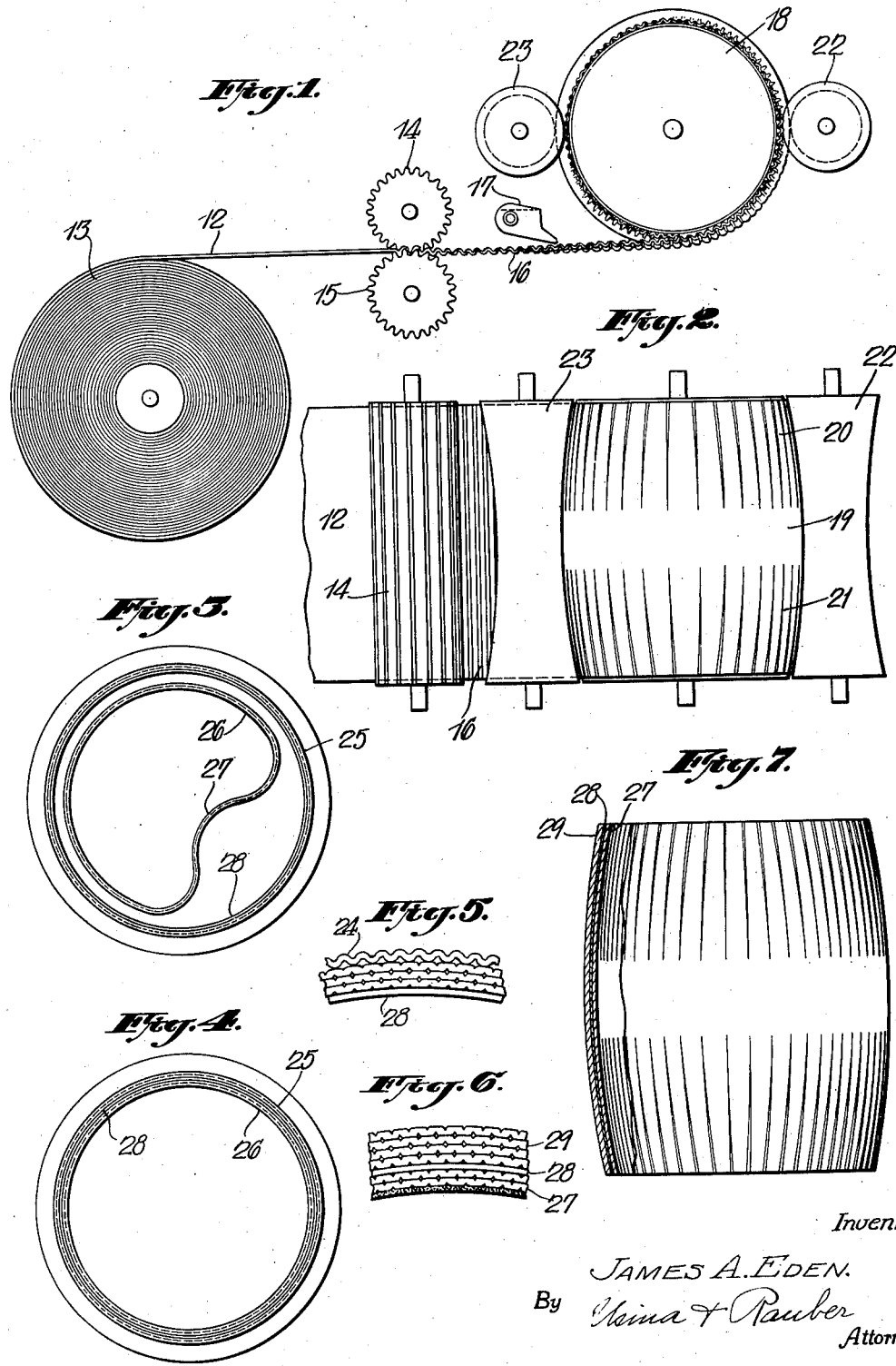

2,030,693

UNITED STATES PATENT OFFICE 2,030,693

LAMINATED PAPER BARREL

James A. Eden, Springfield, Mass.

Application March 23, 1934, Serial No. 716,956

18 Claims. (Cl. 93—36)

My invention relates to a laminated paper barrel construction and to a method of making the same whereby a bilged barrel surface or foundation may be wrapped externally or internally or on both sides with a number of layers of a continuous paper strip so as to form a unitary structure. The bilged surface of a barrel offers difficulties to the formation of a smooth uniform compact laminated structure because when a material such as paper is wrapped thereon to extend over any considerable part of the bilged surface, the part of the wrapping overlying the areas of less diameter tend to crumple unevenly, forming uneven bulges and preventing the formation of a smooth uniform structure. Or, if it be attempted to stretch the paper over the areas of greater diameter, stretching may not take place uniformly, thereby forming areas that are weakened and non-uniform.

An object of my invention is to provide a laminated bilged structure and a method of forming or wrapping the same which will avoid the above difficulties and provide a smooth uniform compact laminated structure.

In my invention a strip of fibrous material, such as paper, which may be any ordinary paper of sufficient toughness and may be either impregnated with any suitable material or not, is first prepared in such a manner that it may expand uniformly in a longitudinal direction when tightly wrapped about a bilged surface or may have a relative longitudinal expansion or contraction between different zones as it is wrapped upon the bilged structure. The preparation of the paper is such also that this longitudinal expansion or relative expansion and contraction may take place progressively from the edges of the paper to the wrapping zone of greatest diameter. During or just prior to the wrapping, an adhesive or plastic material may be applied to the paper to cause the layers to cement together when wrapped on the bilged surface. The paper during wrapping is also ironed or pressed tightly into position to form a compact uniform bilged surface.

When the laminated structure is to be formed on the outer surface of a bilged foundation, it is wrapped under such circumstances that it will later contract and grip the surface tightly. Conversely, when it is placed on the inner surface of the barrel or bilged structure, it is preferably shrunk or contracted so that it may later be expanded tightly against the surface. The capacity of the paper to expand longitudinally to accommodate itself to the bilged surface may be imparted to the paper in any suitable manner as, for example, by crimping the paper transversely or by providing it with transverse shear cuts which may gape or overlap as the paper is wrapped, depending upon whether the shear cuts overlie an area of greater or less diameter.

Examples illustrating the invention are shown in the accompanying drawings, in which—

Fig. 1 is a diagrammatic sketch in side elevation and Fig. 2 a plan view of a barrel being wrapped with paper which is prepared for the longitudinal expansion.

Fig. 3 is a diagrammatic view showing the manner of applying a laminated structure to the interior of a barrel.

Fig. 4 shows an end view of the completed barrel.

Fig. 5 shows an end or edge view showing the manner in which a crimped layer lies on previously formed layers during the wrapping operation.

Fig. 6 is a similar view showing the layers ironed to a compacted position.

Fig. 7 is a side view partly in section of a completed barrel structure.

Figs. 8 and 9 are views similar to Figs. 1 and 2 of an alternative method of preparing the paper for expansion by transverse slits in the central zone of the paper, and Figs. 10 and 11 are similar views showing the paper prepared for relative expansion by transverse shear cuts at the edges of the sheet.

In the method of wrapping the paper shown in Figs. 1 to 7 inclusive, a strip of paper 12 is drawn from a roll 13 and, preferably after being dampened, is passed between a pair of hot crimping rolls 14 and 15 which fold transverse crimps in the paper as indicated at 16. A plastic, such as glue, is then spread uniformly on the paper from a spreading device 17. The paper is then drawn onto the surface of a rotating barrel or mandrel 18, the paper being under sufficient tension to stretch the central part or zone of the paper and to force the crimped portions outside of this central zone to tightly grip the bilged surface of the barrel or mandrel. As indicated in Fig. 2, the central zone 19 may be stretched so as to completely draw out the crimped folds, leaving a smooth tightly drawn zone from which the crimps increase on either side as indicated at 20 and 21. The requisite springiness or stiffness may be imparted to the crimped paper by first dampening it, as mentioned above, and maintaining the crimping rolls 14 and 15 at a sufficiently elevated temperature to dry and shape the crimps into a sufficiently stiff or set shape. The paper may tend to hold its crimped or corrugated shape at the edge portions of the barrel which would render these parts thicker and spongier than the central part. To avoid this, the layers are ironed flat, as they are being wrapped, by the pressure of successive heated rolls 22 and 23 having a shape inverse to the bilge of the barrel and thereby fitting and forcing the paper to the correct bilged shape.

These rolls tend to iron the corrugated structure from that indicated at 24 in Fig. 5 to the flat folded construction indicated at 25 in Fig. 6.

When the laminated paper is being wrapped onto the outer surface of a barrel to form a permanent layer thereon, the paper as it approaches the barrel preferably has a sufficient dampness, or is otherwise conditioned, so that its fibers tend to expand. When it has been wrapped and is dried and heated by the irons 22 and 23, this drying action tends to contract the paper and, as a result, causes it to hug the surface of the barrel with an additional tightness. This aids in forming a unitary compact structure on the barrel.

When the laminations are to be applied to the inside of a bilged barrel structure they are first wrapped on a collapsible mandrel, the construction of which is old in the art and is not illustrated specifically in the accompanying drawings. The paper is wrapped on this mandrel until its outer diameter is sufficient to fit tightly against the inner surface of the barrel to which it is to be applied. The mandrel is then collapsed and the laminated layer 26 thus formed is preferably contracted as much as possible, by drying or otherwise, and by folding as at 27 so as to enter readily into the interior of a barrel wall 28. It is then pressed outwardly against the inner surface of the barrel and may be caused to expand naturally by moistening which causes the fibers of the paper to swell.

The moisture may be retained by painting the inner surface of the barrel with tar or some other moisture-proof coating. The outer surface of the barrel may have been previously wrapped or may thereafter be wrapped with a wrapping of paper 29 to form the completed barrel construction illustrated in Fig. 7.

In the alternative construction shown in Figs. 8 and 9, the strip of paper 12 drawn from a roll 13 is passed through a shearing device 30 which forms a succession or series of closely spaced shear cuts 31 extending transversely of the central zone of the paper but not extending to the edges. These cuts may be taken at any suitable distance as, for example, at intervals of three inches or somewhat more or less. The paper then passes beneath the plastic spreader 17 and is wrapped onto the barrel or mandrel 18. In making the shear cuts it is preferable to use slightly curved knives which may be set or adjusted to provide shear cuts of any desired length. As the paper is wrapped the shear cuts 31 gape or spread, as indicated at 32 in Figs. 8 and 9, progressively from each edge of the shear cut to the central zone or zone of greatest diameter. This spreading enables each layer of paper to lie flat on the underlying layer. To avoid any air bubbles and to ensure a tight compact structure, the paper is ironed by the irons 22 and 23 similar to the construction in Fig. 1.

The diameter of the structure constantly increases with the wrapping and is so arranged that the cuts 31 of one layer are offset from those of the other as indicated at 33 in Fig. 8 and, therefore, prevent any continuous cut or passage from the outer surface of the laminated structure to its inner surface. The inner part of the wrappings may furthermore be strengthened by inserting an intermediate layer of a narrow strip 34 drawn from a roll 35 and, after being coated with plastic adhesive from a spreader 36, passing between the strip 12 being wrapped and the iron 23. This strip 34 as indicated in Fig. 9 is of such a narrow width that it is not puckered or distorted when wrapped on the bilged surface and is sufficiently thin not to affect materially the proper bilged shape of the laminations. It serves to maintain the continuity of the wrappings at the central zone and to strengthen them.

In the modified form of the invention shown in Figs. 10 and 11, the strip 12 is passed through a shearing apparatus 37 which forms transverse shear cuts 38 and 39 extending from the side edges of the strip but terminating short of the central zone. This strip is also coated with adhesive from the spreader 17 and is then wrapped on the barrel or mandrel 18 and ironed by the irons 22 and 23 in a manner similar to that of Figs. 1 and 8.

During this wrapping the central zone 38 is not stretched or distorted but is expanded relatively to the edge portions which contract relatively to the central part by an overlapping of the transversely cut edges, the overlapping extending progressively from the inner edges 39 and 40 of the cuts to the outer edges of the strip. The action of the adhesive supplied from the spreader 17 and of the irons 22 and 23 serves to compress these overlapping parts into a compact uniform structure. To still further strengthen the edge portions, strips of paper, indicated in Fig. 11 at 41 and 42, are supplied from the rolls 43 and pass between the wrapped structure and the iron 23.

It will be understood, of course, that if circumstances render it desirable, the strip 34 or the strips 41 or 42 may be passed between the iron 22 and the laminated structure being formed.

It will also be appreciated that the strips 41 and 42 are so narrow that they are not appreciably distorted or crumpled as they are wrapped onto the bilged surface.

Through the above invention a laminated fibrous covering or lining may be provided for a shaped bilged barrel shell. This shell may be formed of metal or of any suitable material although the invention has been described as applied specifically to paper.

It will be understood that it is equally applicable to any fibrous sheet similar to paper regardless of its material of construction and the term "paper" is used to designate this general class of fibrous sheet.

It will also be understood that any desired plastic may be used for cementing the paper and that the barrels may be finished or surfaced in any suitable manner.

It will be understood that corrugations of any suitable size may be used, for example, a corrugation or pleat about 6/100ths of an inch wide.

What I claim is—

1. A barrel having a bilged surface wrapped circumferentially in successive layers with a continuous strip of paper longitudinally expanded progressively towards its central zone relative to its side edges to conform to the bilged surface and to form a smooth unbroken bilged layer.

2. A barrel having a bilged surface wrapped circumferentially in successive layers with a continuous strip of paper longitudinally expanded progressively towards its central zone relative to its side edges to conform to the bilged surface, and cemented and ironed to a smooth unbroken unitary structure.

3. A barrel having a bilged surface wrapped inside and outside circumferentially in successive layers with a continuous strip of paper longitudinally expanded progressively towards its central zone relative to its side edges to conform to the bilged surface, and cemented and ironed to a smooth unbroken unitary structure.

4. A barrel having a bilged surface wrapped circumferentially with several layers of a continuous strip of paper having transverse crimps and expanded progressively from the side edges of said strip toward a central zone to conform to the bilged surface and form a smooth, unbroken bilged layer.

5. A barrel having a bilged surface wrapped circumferentially with several layers of a continuous strip of paper having transverse crimps and expanded progressively from the side edges of said strip toward a central zone to conform to the bilged surface, said layers being cemented and said crimp marks being ironed flat to provide a compact smooth unbroken structure.

6. A barrel having a bilged surface wrapped circumferentially with several layers of a continuous strip of paper having a series of transverse uniformly spaced shear cuts in its middle zone and wrapped to cause said slits to gape progressively toward the area of enlarged diameter of said bilged surface, the cuts of one layer being offset from those of the other, and said layers being cemented to a unitary unbroken structure.

7. A barrel having a bilged surface wrapped circumferentially with several layers of a continuous strip of paper having a series of transverse uniformly spaced shear cuts in its middle zone and wrapped to cause said slits to gape progressively toward the area of enlarged diameter of said bilged surface, the cuts of one layer being offset from those of the other, said layers being cemented to a unitary unbroken structure and having a narrow strip of paper inserted between said wrappings within the zone of said shear cuts.

8. A barrel having a bilged surface wrapped circumferentially with a continuous strip of paper having transverse shear cuts in its edges, said shear cuts overlapping to provide an expansion of said paper from the edge portions to the central zone to conform to the bilged shape of said barrel, and said wrappings being cemented into a unitary unbroken compact structure.

9. A method of forming a barrel having a laminated paper structure which comprises wrapping a strip of paper about a bilged surface in a number of successive wrappings and expanding the cylindrical zone of said strip of paper relative to the edge portions of said strip during wrapping to cause said wrappings to conform to the bilged surface.

10. A method of forming a barrel having a laminated paper structure which comprises wrapping a strip of paper about a bilged surface in a number of successive wrappings, expanding the central zone of said strip relative to the edge portions of the strip during wrapping to cause said wrappings to conform to the bilged surface, and applying adhesive to the surface of said strip prior to winding.

11. A method of forming a laminated bilged structure which comprises crimping a strip of paper transversely, then wrapping it about a bilged surface while applying tension sufficiently to expand said paper in its central zone during wrapping and causing it to fit tightly in the crimped zones on each side of said central zone.

12. A method of forming a laminated bilged structure which comprises crimping a strip of paper transversely, then wrapping it about a bilged surface while applying tension sufficiently to expand said paper in its central zone during wrapping and causing it to fit tightly in the crimped zones on each side of said central zone, and applying a cementing material to the surface of said paper as it is being wrapped.

13. A method of forming a laminated bilged structure which comprises crimping a strip of paper transversely, then wrapping it about a bilged surface while applying tension sufficiently to expand said paper in its central zone during wrapping and causing it to fit tightly in the crimped zones on each side of said central zone, applying a cementing material to said strip as it is being wrapped, and ironing it on said bilged surface to a smooth bilged shape.

14. A method of forming a laminated bilged structure which comprises forming a series of uniformly spaced transverse shear cuts in a central zone of a strip of paper, and drawing said paper onto a bilged surface in a number of consecutive layers to cause said shear cuts to gape progressively toward the central zone of said bilged surface during the drawing of each layer to cause said paper to conform to said bilged surface and to place the shear cuts of one layer offset from those of another.

15. A method of forming a laminated bilged structure which comprises forming a series of uniformly spaced transverse shear cuts in a central zone of a strip of paper, drawing said paper onto a bilged surface in a number of consecutive layers to cause said shear cuts to gape progressively toward the central zone of said bilged surface during said drawing of each layer and causing said paper to conform to said bilged surface and to place the shear cuts of one layer offset from those of another, and inserting a strip in the central zone of said paper over said shear cuts during said wrapping.

16. A method of forming a laminated bilged structure which comprises forming a series of equally spaced transverse shear cuts on a strip of paper extending from the edges of said paper to a distance short of the central zone thereof, then wrapping said paper circumferentially in a series of layers about a bilged surface, and ironing each layer of said paper thereon to cause said slit edges to overlap and to conform to said bilged surface.

17. A method of lining a barrel with a laminated fibrous structure which comprises wrapping a strip of paper circumferentially about a bilged surface in a series of successive wrappings and causing relative expansion of said paper from the side edges thereof to the central zone thereof during the wrapping of each layer, removing the resulting laminated structure from said bilged surface, contracting it, and thereafter expanding it into the inner surface of a barrel wall.

18. A method of lining a barrel with a laminated fibrous structure which comprises wrapping a strip of paper circumferentially about a bilged surface in a series of successive wrappings and causing relative expansion of said paper from the side edges thereof to the central zone thereof during each wrapping, removing the resulting laminated structure from said bilged surface, contracting it, expanding it into the inner surface of a barrel wall, and thereafter similarly wrapping a strip of paper onto the outer surface of said barrel shell.

JAMES A. EDEN.